Aug. 3, 1965
C. KOLM ETAL
3,198,969
PYROELECTRIC GENERATOR
Filed March 3, 1961
2 Sheets-Sheet 1
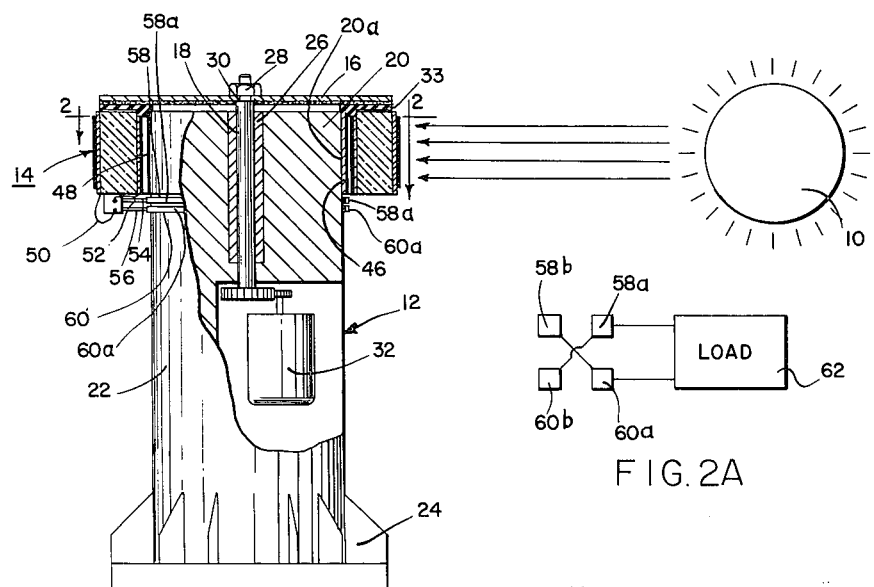
FIG. 2
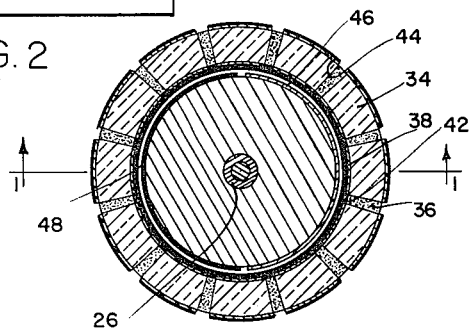
FIG. 2A
FIG. 1
INVENTOR.
CAROL KOLM
PETER H. FOWLER
BY
*Blair E. Buckles*
ATTORNEYS

United States Patent Office 3,198,969
Patented Aug. 3, 1965

3,198,969
PYROELECTRIC GENERATOR
Carl Kolm, Bolton, and Peter H. Fowler, Watertown, Mass., assignors, by mesne assignments, to Sonus Corporation, Cambridge, Mass., a corporation of Delaware
Filed Mar. 3, 1961, Ser. No. 93,237
6 Claims. (Cl. 310—4)

This invention relates to a novel power source capable of direct conversion of heat into electricity. More particularly, it relates to an electrical generator incorporating pyroelectric transducers, which are subjected to a temperature cycling routine to develop charges of alternating polarity thereon.

Our invention is of particular use in cases where power for conventional electromechanical generators is unavailable or the use of such generators is commercially or otherwise impractical. In many such cases there is a source of heat or, more accurately, a temperature differential occasioned by the presence of a heat source and a suitable heat sink capable of absorbing heat from the source. This condition permits the use of various types of "heat engines," some of which are capable of converting the temperature differential directly into electrical energy. However, prior to the present invention, these devices have been characterized by such deficiencies as large size, low efficiency of conversion of heat into electricity and excessive cost.

Accordingly, it is a principal object of our invention to provide an improved electrical generating system adapted to convert heat directly into a usable amount of electrical energy. For example, in some applications, it is desirable to use the electrical energy from the system to run wireless transmitters and receivers.

Another object of the invention is to provide a generating system of the above type characterized by light weight and relatively high conversion efficiency, thereby rendering it suitable for airborne and space applications.

A further object of the invention is to provide a generating system of the above type having a relativley low cost per unit of power capabilty.

Other objects of the invention will in part be obvious and will in part appear hereinafter.

The invention accordingly comprises the features of construction, combinations of elements and arrangements of parts which will be exemplified in the constructions hereinafter set forth and the scope of the invention will be indicated in the claims.

Figure 3:
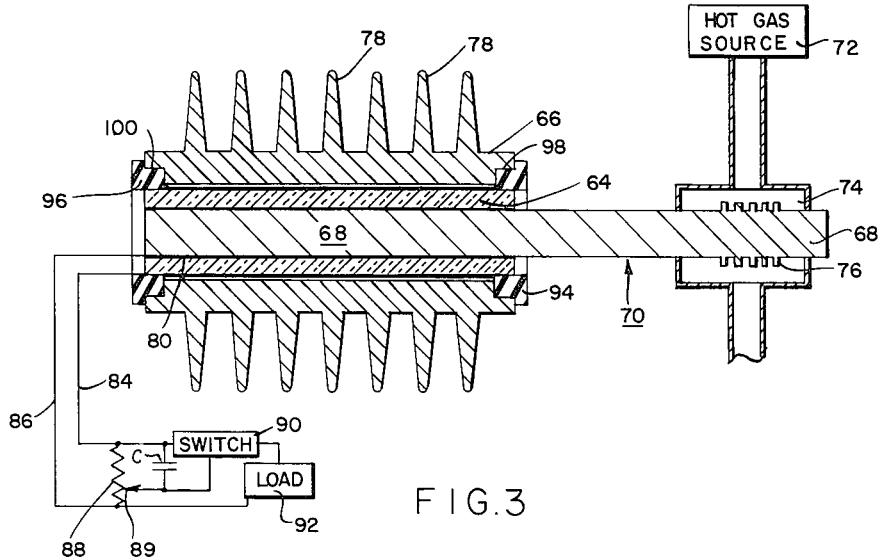
Figure 4:
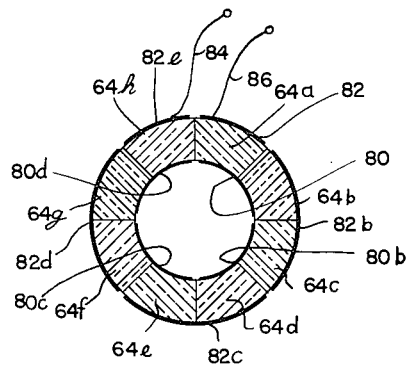

For a fuller understanding of the nature and objects of the invention, reference should be had to the following detailed description taken in connection with the accompanying drawings, in which:

FIGURE 1 is a sectional view of a generator incorporating the principles of our invention, taken along line 1—1 of FIGURE 2, FIGURE 2 is a side view, partly in section of the generator of FIGURE 1, FIGURE 2a is a schematic representation of an electric circuit used with the generator of FIGURES 1 and 2, FIGURE 3 is a longitudinal section of another embodiment of our invention, with some of the elements represented schematically, and FIGURE 4 is a sectional view of a pyroelectric cylinder which may be used in the generator of FIGURE 3.

In general, our invention makes use of piezoelectric transducers, preferably of the ceramic type widely used as electroacoustical transducers. A transducer of this type has a strong remanent electrical polarization, and changes in dimension along the axis of polarization result in the development of a voltage between electrodes intersected by this axis. Since the dimensions of the transducer change with temperature, in common with most materials, a piezoelectric voltage is developed whenever the temperature of the transducer varies.

Also, there are strictly pyroelectric effects associated with transducers of this type. That is, a voltage is developed when the temperatue is changed, even though changes in dimension are blocked. This is known as the "primary pyroelectric effect." The voltage produced by the piezoelectric action is termed the "secondary effect." There is also a "tertiary effect," the development of a voltage proportional to the rate of change of temperature or the temperature gradient.

All three pyroelectric effects develop voltages whose polarity depends on whether the temperature is increased or decreased. More specifically, when the temperature is increasing, with heat flow in the direction of the polarization, the voltages developed by all three effects are of the same polarity. We have made use of the pyroelectric effects by cyclically exposing the transducers to the elevated temperature of a heat source and then to the lower temperature of a heat sink. The voltages developed between th transducer electrodes are applied to the electrical load which is to consume the generated power.

Referring now to FIGURES 1 and 2, a generator embodying our invention may include a radiation source 10, an internal heat sink generally indicated at 12, and a pyroelectric cylinder generally indicated at 14 mounted on a spider support 16 for rotation on a spindle 18. As seen in FIGURE 2, the heat sink 12 includes an upper cylinder 20, a central column 22 and a finned radiator 24. The cylinder 20, which is coaxial with the cylinder 14, accommodates a bearing 26 journalling the spindle 18 for rotation therein. The spider 16, which is keyed to the spindle 18, is secured in place by a nut 28 working against a shoulder 20 on the spindle. The spindle is rotated by means of a motor 32, suitably coupled thereto. The spider support 16 and cylinder 14 are bonded to an intermediate elastomeric ring 33 which permits expansion and contraction of the cylinder as its temperature changes.

As best seen in FIGURE 1, the cylinder 14 includes a plurality of pyroelectric transducers 34 secured to each other by means of suitable bonding layers 36. The inner and outer radially facing surfaces of each of the transducers 34 are covered with electrodes 38 and 40, and the electrodes, in turn, are covered by suitable black coatings 42 and 44 to facilitate absorption of radiant energy from the heat source 10 and emission of radiation to heat sinks, including the sink 12.

More specifically, the cylinder 20, whose outer surface 20a is closely spaced from the inner surface 14b of the cylinder 14, has a silvered reflecting coating 46 facing the source 10 and a black radiation-absorbing coating 48 facing in the opposite direction. Thus, as the cylinder 14 is rotated by the motor 32, the transducers 34 in the portion of the cylinder reached by radiation from the source 10 absorb heat from the source, with a consequent rise in temperature. Because of the reflective coating 46, there is essentially no radiative transfer of heat to the sink 12 at this time. This effect is enhanced by the fact that the spacing between the cylinders 14 and 20 is increased by the circumferential expansion of the transducers 34 resulting from the increased temperature thereof.

As the transducers continue around from the heat input side of the generator, they pass opposite the heat absorbing coating 48, which facilitates radiative transfer of heat to the cylinder 20 and then down through the column 22 to the radiator 24. The heat sink 12 should, of course, be made of material, such as aluminum, having a high heat conductivity. As the transducers 34 cool, they shrink in size and thus move closer to the cylinder 20, thus enhancing transfer of heat to the cylinder. Furthermore, there is a net radiation of heat from the coatings 44 facing away from the source 10.

Thus, as the cylinder 14 rotates, the individual transducers 34 undergo increases and decreases in temperature. The maner in which these temperature changes are converted into usable electrical energy is as follows.

With the electrode configuration illustrated in FIGURES 1 and 2, the transducers 34 are polarized in the radial direction of the cylinder 14, i.e., perpendicular to the electrodes 38 and 40. As seen in FIGURE 2, the electrodes of each transducer 34 are connected by means of leads 50 and 52 to brushes 54 and 56, contacting the segments of commutators 58 and 60, respectively, electrically insulated from the cylinder 20.

Referring now to FIGURE 2a, the commutator segments 58a and 60a on the heat input side of the generator, i.e., the segments contacted by the brushes of the individual transducers 34 during the period of temperature rise thereof, are connected across an electrical load indicated at 62. The segments 58b and 60b on the low temperature side of the generator are also connected across the load, but with the opposite polarity to that of segments 58a and 60a. Thus, as each transducer 34 attains its maximum rise in temperature, just prior to leaving the heat input side of the generator, the pyroelectric charges on its electrodes 38 and 40 are transferred to the load 62 by the contact between its brushes 54 and 56 and the commutator segments 58a and 60a. Similarly, after the transducer has cooled, thereby developing a pyroelectric voltage of the opposite polarity, it again loses its charge to the load, this time by means of the segments 58b and 60b.

Assuming that the rays from the source 10 striking various portions of the surface of the cylinder 14 are parallel, the power obtainable from the generator of FIGURES 1 and 2 will increase with the radius of the cylinder 14 and also its axial length. The thickness of the cylinder is also a factor determining the power which may be obtained from the unit.

More specifically, if the cylinder 14 is made thinner, transducers 34 will heat and cool off more quickly. Therefore, the rotation of the cylinder may be speeded up so that in a given time more of the transducers deliver their energy to the load 62. On the other hand, it can be shown that, for a given temperature excursion, the energy obtainable from one of the transducers resulting from the primary and secondary pyroelectric effects, i.e., almost the entire energy, is proportional to the volume of the transducer. The volume is, of course, inversely proportional to the thickness, and, therefore, the energy developed in each transducer 34, each time it makes one revolution, decreases as the thickness of the cylinder 14 is decreased.

Thus, it will be seen that there is a thickness for which the power output from the generator is at a maximum. Above this thickness, the loss of power due to the slower speed required is greater than the increase in energy per transducer per cycle. If the thickness is less than this value, the decrease in energy per transducer is greater than the increase in power resulting from higher speed operation. The optimum thickness depends on such factors as the rate at which heat can be absorbed from the source, the temperature of the heat sink and the heat conductivity and specific heat of the transducer material.

In FIGURE 3 we have illustrated another embodiment of our invention in which a pyroelectric cylinder 64 is concentric with an outer heat sink generally indicated at 66, as well as an inwardly disposed shaft 68 of a heat source generally indicated at 70. In addition to the shaft 68, the heat source 70 includes a hot gas source 72, which projects hot gasses into an enclosure 74 surrounding the lower end 68a of the shaft 68. Fins 76 aid in transferring heat from the gas to the shaft 68. The shaft, which is of a material having a high heat conductivity, in turn conducts the heat to the cylinder 64.

The cylinder, in absorbing heat from the shaft 68, undergoes an increase in temperature, with a resulting radial expansion away from the shaft until it engages the heat sink 66. The latter conducts heat away from the cylinder and disposes of it with the aid of fins 78. The cylinder 64 then cools and returns to the shaft 68, whereupon the cycle is again repeated.

More specifically, the cylinder 64, which is of a pyroelectric material, has inner and outer electrodes 80 and 82, preferably taking the form of highly reflective silver coatings to minimize transfer of heat into and out of the cylinder by radiation. Leads 84 and 86 connect the electrodes 82 and 80 to the ends of a potentiometer 88. The tap 89 of the potentiometer is connected to the control electrode of a switch 90, which is in series with a load 92 across the leads 84 and 86. A capacitor C is connected between the tap 89 and the lead 84. The switch 90 may take the form of a thyratron or a silicon controlled rectifier. Thus, once the voltage at the control electrode reaches a "firing potential," the switch conducts and remains in that condition until the voltage of the source switched thereby drops below a certain minimum level.

During operation, the cylinder 64 is centered with respect to the shaft 68 and heat sink 66 by a pair of rings 94 and 96 disposed between the cylinder 64 and shoulders 98 and 100 on the heat sink. The rings 94 and 96 are of highly resilient material such as silicone rubber, capable of withstanding the temperature to which the cylinder 64 is subjected.

In FIGURE 3, the relative dimensions have been exaggerated for the sake of clarity. In practice, the cylinder 64 may have a thickness of 50 mils, a length of several inches and a radius of the same order of magnitude. When the cylinder in contracted against the shaft 68, the spacing between the outer electrode 82 and the heat sink 66 may be of the order of 50 mils.

In considering operation of the generator of FIGURE 3, assume that a temperature of the cylinder 64, slightly greater than that of the heat sink 66, corresponds to a shrink-fit of the cylinder on the shaft 68. Conversely, a cylinder temperature slightly less than that of the shaft 68 corresponds to a similar fit between the cylinder and the heat sink. If, at a low temperature, the cylinder 64 is suddenly drawn into contact with the shaft 68, conduction of heat from the shaft to the cylinder will result in a rapid temperature rise in the latter. We may assume that the polarization in the cylinder 64 is such that the primary and tertiary pyroelectric effect accompanying the temperature rise cause the lead 84 to become positive with respect to the lead 86.

With the extreme thinness of the cylinder, the temperature rise is very rapid, so that the combined wave form of the primary and tertiary voltages is similar to a fairly sharp pulse. This pulse is readily passed by the capacitor C to the tap 89 and control electrode of the switch 90. The switch is rendered conducting, thereby connecting the load 92 to the lead 84. The load 92 has an impedance which is substantially less than the impedance of the cylinder 64 as defined below, and, therefore, the series combination of the switch 90 and load 92 acts essentially as a short circuit across the electrodes 80 and 82.

The short circuiting of a pyroelectric transducer greatly retards the change in dimension thereof resulting from temperature changes, and, thus, by the time the cylinder 64 has developed sufficient internal stresses to recover from its shrink-fit and begin to expand away from the shaft 68, it has reached a temperature almost equal to that of the shaft. This temperature, as pointed out above, is great enough to provide expansion all the way to the heat sink 66 and, in addition, effect a compression fit against the heat sink. The energy from the first and third pyroelectric effects has by now been dissipated in the load 92, and the switch 90 has accordingly opened to disconnect the load from the load 84.

With the load 84 disconnected, the cylinder 64 expands rapidly and the secondary pyroelectric effect (piezoelectric effect 3 comes into play. This voltage is ultimately substantially greater than the primary and tertiary voltages, but its rate of increase is materially less, and, therefore, it is not bypassed to the tap 89 by the capacitor C. Thus, the voltage at the tap 89 depends on the setting of the tap as well as the voltages at the lead 84 with respect to ground. The tap 89 is set so that its voltage will reach the firing level of the switch 90 just before the cylinder 64 contacts the heat sink 66. At this point the switch once again conducts, to discharge the secondary energy into the load 92; the switch then opens, just as contact is made between the cylinder and heat sink.

Then the reverse process begins, except that this time the polarity of the primary and secondary voltages is reversed. The switch 90 conducts initially to help delay contraction of the cylinder 64 and then shuts off to permit rapid contraction thereof. Just prior to contact with the shaft 90, the switch is turned on to deliver secondary energy to the lead 92.

The expansion and contraction of the cylinder 64 thus continues indefinitely. The rate at which this occurs can be quite rapid. In fact, a rate of 40,000 cycles per second may be desirable for a unit having the above dimensions. By suitable choice of radius, this may be made to correspond to the natural frequency of the cylinder 64 in the radial mode, and the resulting resonance aids in effecting the desired motion.

The impedance of the cylinder 64 may be roughly defined as the capacitive reactance at the frequency of operation. As pointed out above, the impedance of the load 92 should be substantially less than the impedance of the cylinder at the effective frequency of the primary-tertiary voltage spike. More importantly, it should also be substantially less at the cyclic operating rate of the generator. This will insure essentially complete discharge of the piezoelectric energy to the load 90.

The impedance of the load 90 should, of course, be substantially greater than that of the switch 90 when the latter is conducting, so that substantially all of the power developed in the cylinder 64 is dissipated in the load.

In many cases, the cylinder 64 will be so thin that the resulting high capacitance thereof will provide a fairly low impedance. It may then be difficult to provide a load impedance which is substantially lower than the impedance of the cylinder. In such cases, one may resort to the confiurgation of FIGURE 4, in which the cylinder 64 is schematically divided into a series of arcuate segments 64a–64h. These segments may again be radially polarized, but with polarization in the opposite direction in adjacent segments. Thus, in the segment 64a, the polarization may be in the outward direction, and, in segments 64b and 64h, it will then be inward. The electrodes 80 and 82 are also segmented, with an inner electrode segment 80a covering the cylinder segments 64a and 64b, an overlapping outer segment 82b on the segments 64b and 64c, a further overlapping segment 80b and so on around the cylinder 64.

Thus, it will be seen that between the leads 84 and 86, connected to the outer electrode segments 82e and 82a, there is a capacitance comprising the capacitance of the individual segments in series. Furthermore, the voltage developed between the electrodes 82a and 80a adds to the voltage developed between the segments 80a and 82b, and so on around the cylinder. The increase in output voltage is offset by the decrease in capacitance, so that the total power developed by the cylinder 64 is unchanged. In the illustrated embodiment, the composits capacitor is eight times as thick as the cylinder 64 of FIGURE 3, and, furthermore, the effective area of each of each segment is one-eighth the area of the capacitor in FIGURE 3. Accordingly, the capacitance is reduced by a factor of 1/64.

It will be appreciated that other circuit elements than the ones specifically shown in FIGURE 3 can be used in accomplishing the functions set forth above. For example, a capacitor (not shown) connected between the lead 84 and load 92 may be used together with, or in place of, the capacitor C.

Moreover, different modes of operation are within the contemplation of over invention. Thus, the use of a switch may be dispensed with and the cylinder 64 connected directly to the load 92. However, in that case care must be taken in selecting the various parameters affecting operation, or the cylinder may come to an equilibrium position between the shaft 68 and heat sink 66, with a complete cessation of operation. Also, the constant connection to the load will slow down operation somewhat, with a correspondingly reduced power output.

It will be apparent that two important advantages of system shown in FIGURE 3 are the absence of wear-producing motion and the omission of sources of motion external to the pyroelectric transducer.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein, described, and all statements of the scope of the invention which, as a matter of language, might be said to fall therebetween.

We claim:
1. An electrical generating system comprising, in combination, a pyroelectric transducer having a pair of electrodes, said transducer being capable of developing a voltage between said electrodes in response to changes in its temperature, an electrical load connected to said transducer, a radiant heat source, a heat sink, a relatively efficient heat absorbing surface on said transducer, and means for rotating said transducer so that said surface cyclically faces said heat source and then said heat sink.

2. An electrical generating system comprising, in combination, a plurality of pyroelectric transducers bonded together to form a generally cylindrical shell, each of said transducers having a pair of electrodes and being capable of developing a voltage between said electrodes in response to changes in its temperature, a heat source and a heat sink, said source and sink being in relatively close thermal relationship with said shell at different circumferentially spaced areas thereon, means for rotating said shell about the axis thereof to cyclically bring said transducers into heat exchange relationship with said source and then said sink, an electrical load and means for connecting said electrodes to said load.

3. The combination defined in claim 2, in which one of said heat source and said sink is disposed radially outward therefrom.

4. The combination defined in claim 2, including commutating means connecting said electrodes to said load at substantially the temperature extremes of said transducers.

5. An electrical generating system comprising, in combination, a plurality of pyroelectric transducers bonded together to form a substantially cylindrical shell, a cylinder of high heat conductivity disposed concentrically within and closely spaced from said shell, means for dissipating heat absorbed by said cylinder from said shell, a heat source in relatively close heat exchange relationship with a portion of the exterior surface of said shell, means for rotating said shell about the axis thereof, each of said transducers having a pair of electrodes and being capable of developing a voltage between said electrodes in response to changes in its temperature, an electrical load and commutating means for connecting said electrodes to said load at substantially the temperature extremes of said transducers.

6. The combination defined in claim 5, in which the exterior and interior surfaces of said shell have highly heat absorbing characteristics, the portion of the circumferential surface of said shell facing said heat source being of a material having highly reflective characteristics and the portion of said circumferential surface facing away from said heat source being of a material having highly heat absorbent characteristics.

References Cited by the Examiner

Aviation Week, "Paddlewheel Satellite Probes Radiation," August 17, 1959, volume 71, No. 7, pages 30–32.

Electronics, "New Power Sources for Space-Age Electronics," March 20, 1959, volume 32, No. 12, pages 43–47.

ORIS L. RADER, *Primary Examiner*.

MILTON O. HIRSHFIELD, *Examiner*.